US008416256B2

(12) United States Patent
Neal et al.

(10) Patent No.: US 8,416,256 B2
(45) Date of Patent: Apr. 9, 2013

(54) PROGRAMMABLE DITHERING FOR VIDEO DISPLAYS

(75) Inventors: Greg Neal, Morgan Hill, CA (US); Dinesh Shedge, Sunnyvale, CA (US)

(73) Assignee: STMicroelectronics, Inc., Coppell, TX (US)

( * ) Notice: Subject to any disclaimer, the term of this patent is extended or adjusted under 35 U.S.C. 154(b) by 782 days.

(21) Appl. No.: 12/491,571

(22) Filed: Jun. 25, 2009

(65) Prior Publication Data

US 2010/0238193 A1 Sep. 23, 2010

Related U.S. Application Data

(60) Provisional application No. 61/161,283, filed on Mar. 18, 2009.

(51) Int. Cl.

| | |
|---|---|
| ***G09G 3/36*** | (2006.01) |
| ***G09G 5/00*** | (2006.01) |
| ***G09G 5/36*** | (2006.01) |
| ***H04N 5/14*** | (2006.01) |
| ***H04N 5/00*** | (2006.01) |
| ***H04N 5/66*** | (2006.01) |
| ***H04N 1/405*** | (2006.01) |
| ***H04N 1/40*** | (2006.01) |
| ***G06K 9/00*** | (2006.01) |
| ***G06K 9/40*** | (2006.01) |

(52) U.S. Cl.

USPC ............. 345/596; 345/89; 345/606; 345/644; 345/547; 345/696; 348/571; 348/615; 348/739; 358/448; 358/3.13; 382/162; 382/252; 382/254; 382/274

(58) Field of Classification Search .................. 345/581, 345/643–644, 530, 545–547, 536, 560, 561, 345/567, 204, 690, 694–696, 77, 89, 58, 345/63, 87, 96, 596, 606; 348/447, 497, 348/571, 574, 607–615, 739, 761; 358/533–535, 358/448, 461, 3.13; 382/162, 252, 254, 274
See application file for complete search history.

(56) References Cited

U.S. PATENT DOCUMENTS

| | | | | |
|---|---|---|---|---|
| 5,625,707 | A * | 4/1997 | Diep et al. | 382/157 |
| 6,970,152 | B1 * | 11/2005 | Bell et al. | 345/100 |
| 7,911,437 | B1 * | 3/2011 | Bell | 345/100 |
| 8,102,351 | B2 * | 1/2012 | Tang | 345/96 |
| 2005/0225512 | A1 * | 10/2005 | Yamada et al. | 345/63 |
| 2006/0221401 | A1 * | 10/2006 | Daly et al. | 358/3.13 |
| 2008/0180378 | A1 * | 7/2008 | Tang | 345/96 |
| 2010/0207959 | A1 * | 8/2010 | Qi et al. | 345/597 |
| 2010/0295836 | A1 * | 11/2010 | Matsumoto et al. | 345/211 |

* cited by examiner

*Primary Examiner* — Wesner Sajous
(74) *Attorney, Agent, or Firm* — Beyer Law Group LLP

(57) ABSTRACT

In a liquid crystal display (LCD) driver circuit, harmonizing a pixel inversion pattern and a dither pattern is disclosed. The pixel inversion pattern and the cooperating dither pattern interact with each other in such a way that there is substantially no discernable video artifacts generated. The cooperating dither pattern can be selected from a plurality of dither patterns using a programmable dither block.

14 Claims, 12 Drawing Sheets

700
Programmable logic module 702
Dither pattern memory
Pattern memory row address
Pattern memory row data
Frame3
Frame2
Frame1
Frame0
YPos3
YPos2
YPos1
YPos0
XPos 3
XPos 2
XPos 1
XPos 0
RedDitherUp /Down
Pattern memory row bit for Red
Red3
Red2
Red1
Red0
GrnDitherUp/ Down
Pattern memory row bit for Green Grn3
Grn2
Grn1
Grn0
BluDitherUp/ Down
Pattern memory row bit for Blue
Blu3
Blu2
Blu1
Blu0

PROGRAMMABLE DITHERING FOR VIDEO DISPLAYS

CROSS REFERENCE TO RELATED APPLICATIONS

This patent application takes priority under 35 U.S.C. 119 (e) to U.S. Provisional Application No. 61/161,283 entitled, "Method of Dithering 10 Bit Digital Data for 6 or 8 Bit Panels" by Neal et al. filed Mar. 18, 2009 which is incorporated by reference in its entirety for all purposes.

FIELD OF THE INVENTION

The invention relates display devices having limited color palettes such as liquid crystal displays (LCDs). More specifically, the described embodiments described at least systems, methods, and apparatus suitable for providing programmable dithering for displays having a reduced color pallet.

BACKGROUND OF THE INVENTION

Liquid crystal displays (LCDs) are increasingly being used for the display device in televisions, personal computers, etc., and in much state-of-the-art equipment such as automotive navigation systems and simulation devices. Many LCDs use what is referred to as a fixed color palette. One of the problems associated with using a fixed color palette is that many of the colors needed to provide a satisfying image may not be available in the palette. In order to overcome this problem dithering is used to create the illusion of color depth in images with a limited color palette (color quantization). More specifically, dithering is an intentionally applied form of noise, used to randomize quantization error, thereby preventing large-scale patterns such as "banding" (stepwise rendering of smooth gradations in brightness or hue) in images. In a dithered image, colors not available in the palette are approximated by a diffusion of colored pixels from within the available palette. The human eye perceives the diffusion as a mixture of the colors within it. In this way, dithering takes advantage of the human eye's tendency to "mix" two colors in close proximity to one another. Typically, in most video displays, dithering is performed \using a fixed pattern that has been optimized for the particular video display. For example, for every pixel in the image the value of the pattern at the corresponding location is used as a threshold. Therefore, since different patterns can generate completely different dithering effects, there is generally a well defined dithering pattern used for a particular display device. The conventional technique of dithering is utilized to display many colors and grey scales on a display device having relatively few colors and grey scales without having to change the resolution of the display device. For example, through the use of the dithering technique, it is possible to display a 16-color image on a display device having only an 8-color palette. Similarly, by using dithering, it is possible to display an image formed from 16 grey scales on a binary display device in which each pixel can only be turned on or off. The underlying principle of dithering is to rely on a particular spatial distribution of illuminated pixels and non-illuminated pixels to reproduce the color and/or brightness of an original image on the display.

It is well known that every pixel in an LCD must be driven with an AC signal in order to avoid permanent damage to the liquid crystal since the liquid crystal material degrades if the electric field is applied to the liquid crystal material continuously in the same direction. Therefore, in order to avoid damaging the liquid crystal, the AC drive signal causes the direction in which the electric field is applied to be constantly changed where the switching of electrode voltage values between positive and negative values is referred to as inversion drive. Unfortunately, however, what is referred to as a kickback voltage is generated by parasitic capacitance in the pixels such that the RMS of the positive voltage is different from the RMS of the negative voltage. Accordingly, the amount of light permeating the liquid crystal material in the odd frames and that of light permeating the liquid crystal material in the even frames is different resulting in what is commonly referred to as screen (or luminance) flicker observed in units of one-half of frame frequency of, for instance, 60 Hz (or 30 Hz).

A common approach to avoiding this flicker, in every frame only approximately one half of the pixels are driven with a positive voltage whereas the remaining pixels are driven with a negative voltage. Typically the positively driven and negatively driven pixels are interleaved in what is referred to as a pixel inversion pattern in order to further mitigate any flicker. Such pixel inversion patterns can take many forms, such as a checkerboard pattern, etc. However, in some instances, the pixel inversion pattern can interact with a dither pattern to create unacceptable video artifacts. For example, the pixel inversion pattern and the dither pattern can interact in such a way as to create visible banding in the display video image.

Therefore, it would be desirable to provide system that harmonizes a pixel inversion pattern and a dither pattern for a display.

SUMMARY OF THE DESCRIBED EMBODIMENTS

The embodiments described herein relate to harmonizing a pixel inversion pattern and a dither pattern in accordance with a video display. Since a particular display can utilize a well defined pixel inversion pattern, it would be advantageous to provide the capability of programmably providing a particular video display with a dither pattern that at least partially harmonizes with the pixel inversion pattern. In this way, any visual artifacts resulting from the interaction between the pixel inversion pattern and the pixel dither pattern can be substantially reduced if not completely eliminated.

In one embodiment, a method of harmonizing a pixel inversion pattern and a dither pattern by a liquid crystal display (LCD) driver circuit is disclosed. The method can be performed by carrying out at least the following operations. Determining the pixel inversion pattern for the LCD and then determining a cooperating dither pattern. The pixel inversion pattern and the cooperating dither pattern interact with each other in such a way that there is substantially no discernable video artifacts generated. One aspect of the embodiments provides for programmably selecting the cooperating dither pattern from a plurality of dither patterns stored in memory device. The memory device being included in or in communication with the LCD driver circuit.

In another embodiment, computer readable medium for storing computer code for harmonizing a pixel inversion pattern and a dither pattern in a liquid crystal display (LCD) driver circuit is disclosed. The computer readable medium includes at least computer code for determining the pixel inversion pattern for the LCD, and computer code for determining a cooperating dither pattern. The pixel inversion pattern and the cooperating dither pattern interact with each other in such a way that there is substantially no discernable video artifacts generated.

In still another embodiment, an apparatus for harmonizing a pixel inversion pattern and a dither pattern is disclosed. The apparatus includes at least a programmable dither in communication with a processor arranged to determine the pixel inversion pattern for the LCD, and determine a cooperating dither pattern. The pixel inversion pattern and the cooperating dither pattern interact with each other in such a way that there is substantially no discernable video artifacts generated.

In yet another embodiment, an integrated circuit is disclosed. The integrated circuit includes a programmable dither block and a processor in communication with the programmable dither block arranged to harmonize a pixel inversion pattern and a dither pattern for an LCD. The integrated circuit harmonizes the patterns by determining the pixel inversion pattern for the LCD, and determine a cooperating dither pattern such that the pixel inversion pattern and the cooperating dither pattern interact with each other in such a way that there is substantially no discernable video artifacts generated.

DETAILED DESCRIPTION OF SELECTED EMBODIMENTS

Figure 1:
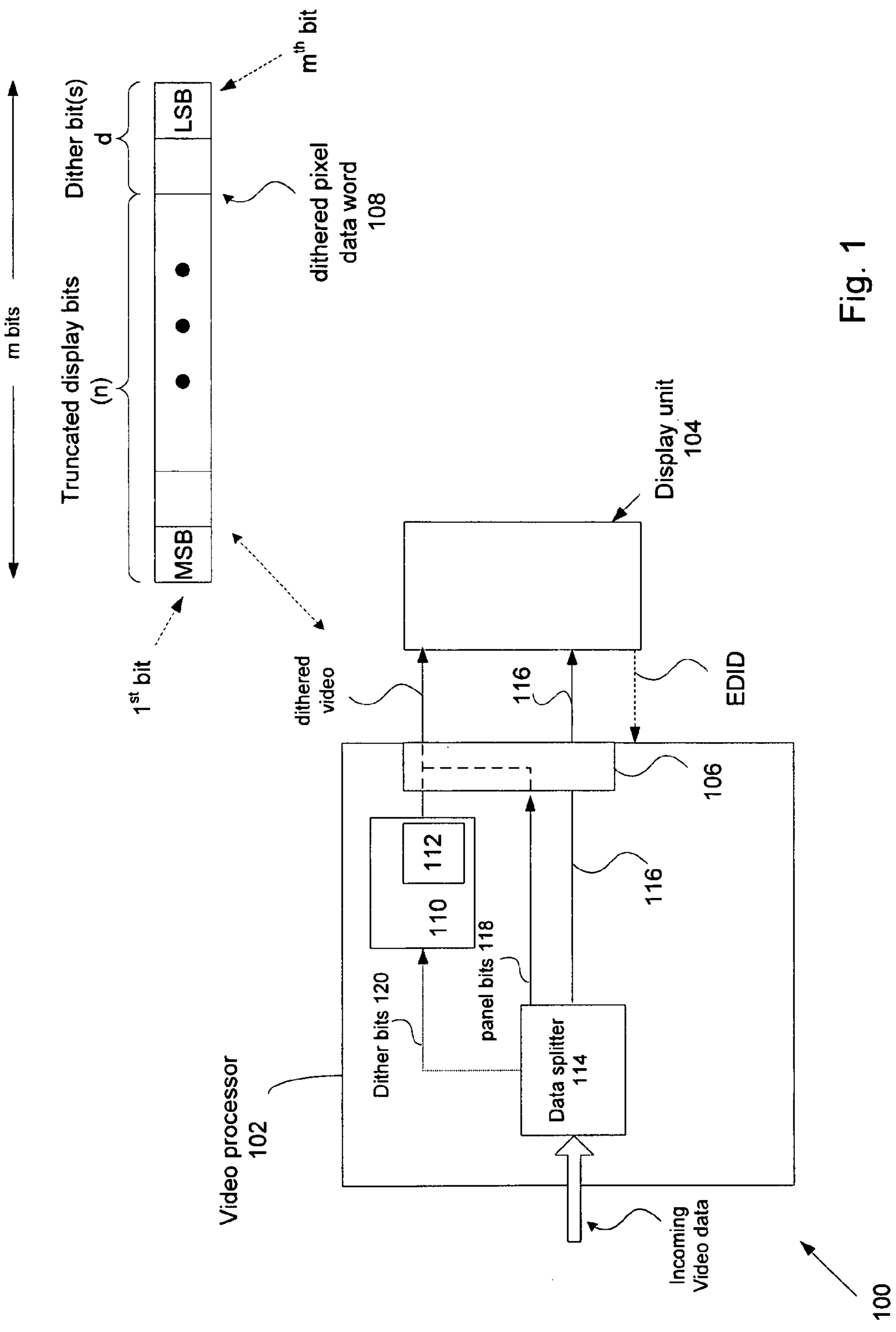
FIG. 1 illustrates a representative system in accordance with the described embodiments.

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

The embodiments described herein relate to harmonizing a pixel inversion pattern and a dither pattern in accordance with a video display. Since a particular display can utilize a well defined pixel inversion pattern, it would be advantageous to provide the capability of programmably providing a particular video display with a dither pattern that at least partially harmonizes with the pixel inversion pattern. In this way, any visual artifacts resulting from the interaction between the pixel inversion pattern and the pixel dither pattern can be substantially reduced if not completely eliminated.

In some cases, a video processor can only provide video data having m bits per color to a display that can only display n bits per color, where m>n. In this situation, the video processor can operate in what is referred to as a dithering mode. In the dithering mode, an appropriate number of least significant bits of the video data provided by video processor to the display can be truncated to a length appropriate for display. However, undesired visible artifacts (such as banding) can result from such truncation of video data. In order to reduce such artifacts, conventional graphics processors can employ spatial dithering. Spatial dithering introduces noise to the least significant bit (or bits) of the displayed pixels by applying specially-chosen dither bits to blocks of color component words. For example, visible banding can result when Y-bit pixels of a frame of input video data (indicative of a continuously decreasing color across a region) are truncated to X-bit pixels (where X<Y) to produce a frame of X-bit output data and the frame of X-bit output data is displayed (due to sudden transitions across the region in the values of the least significant bits of the displayed output words). Spatial dithering can add noise to the least significant bits of the output words to prevent such banding. However, when a purely spatial dither pattern is applied (so that the dither pattern does not vary from frame to frame) the pattern can be very visible, especially if the display bit depth is low (e.g., when displaying 12-bit pixels, each comprising three 4-bit components).

Temporal dithering attempts to make dither pattern application invisible by varying the applied pattern from frame to frame. When employing temporal dithering, the noise (dither pattern sequence) added to a sequence of frames should have a time average substantially equal to zero. For example, if the un-dithered data is a stream of identical pixels, the pixels of each frame of the dithered data will not all be identical, but the time average (over many frames of the dithered data) of the color displayed at each pixel location on the display screen should not differ significantly from the color of the displayed un-dithered data.

However, depending on the algorithm used to vary an applied dither pattern from frame to frame, temporal dithering can cause the undesirable visible artifact known as “flicker.” Flicker results when dithering produces a sequence of pixels that are displayed at the same location on a display screen with periodically varying intensity, especially where the frequency at which the intensity varies is in a range to which the eye is very sensitive. The human eye is very sensitive to flicker that occurs at about 15 Hz, and more generally is sensitive to flicker in the range from about 4 Hz to 30 Hz (with increasing sensitivity from 4 Hz up to 15 Hz and decreasing sensitivity from 15 Hz up to 30 Hz). If the pixels displayed at the same screen location (with a frame rate of 60 Hz) have a repeating sequence of intensities (within a limited intensity range) that repeats every four frames due to dithering, a viewer will likely perceive annoying 15 Hz flicker, especially where each frame contains a set of identical pixels of this type that are displayed contiguously in a large region of the display screen. However, if the pixels displayed at the same screen location (with a frame rate of 60 Hz) have a repeating sequence of intensities (in the same intensity range) that repeats every sixteen frames, a viewer will be much less likely to perceive as flicker the resulting 3.75 Hz flicker.

In order to reduce the flicker caused by temporal dithering a repeating sequence of dither bits with a sufficiently long period of repetition can be used. However, until the present invention, dithering had not been implemented in a programmable manner that allows the user to vary both spatial and temporal dither parameters so as to reduce artifacts caused by the dither process itself or the interaction of dithering with other processes, such as pixel inversion.

The invention will now be described in terms of a video display system having a video source coupled to a video sink, or receiver, by way of a digital interface. Data can be transmitted from the source, or transmitter, to the sink, or receiver using a stream of data transfer units transmitted through a single channel of the main link.

FIG. 1 illustrates a representative system in accordance with the described embodiments. System 100 includes video processor 102 arranged to provide video data for display on display unit 104. Typically, prior to the actual transmission of video data to display 104, video processor 102 can interrogate display unit 104 in order to determine display capability of display unit 104. In this way, video processor 102 can provide the video data in the format most relevant for display 104. In one embodiment, display unit 104 can provide salient display information using a system referred to as extended display identification data, or EDID that permits display 104 to provide such information as display format, timing, etc. Once video processor 102 has successfully interrogated display 104, video processor 102 can provide video data to display 104 in the appropriate format by way of video processor interface 106. For example, display 104 can provide EDID to video processor 102 indicating that the pixels that go into forming the display matrix are each are capable of utilizing at most n bits for each color, red (R), green (B), and blue (B), for a total of at least N bits (where N=3n) bits.

However, in some cases, video processor 102 can only provide video data having m bits per color (i.e., M=3m) where M>N. In this situation, video processor 102 can operate in what can be referred to as a dithering mode in which a full length video data word (i.e., that represents a full color gamut video) can be truncated by an appropriate number of least significant bits to a length appropriate for display 104. For example, in order to generate video data for display on an 18-bit display device (i.e., n=6), a graphics processor that generates 40-bit pixels (i.e., m=10) can operate in the dithering mode in which the two (or four) least significant bits of each 10-bit green component, 10-bit red component, and 10-bit blue component can be truncated to generate 24 or 18-bit output pixels (each comprising three 8 or 6-bit color components) which are then provided to the display 104.

Figure 2:
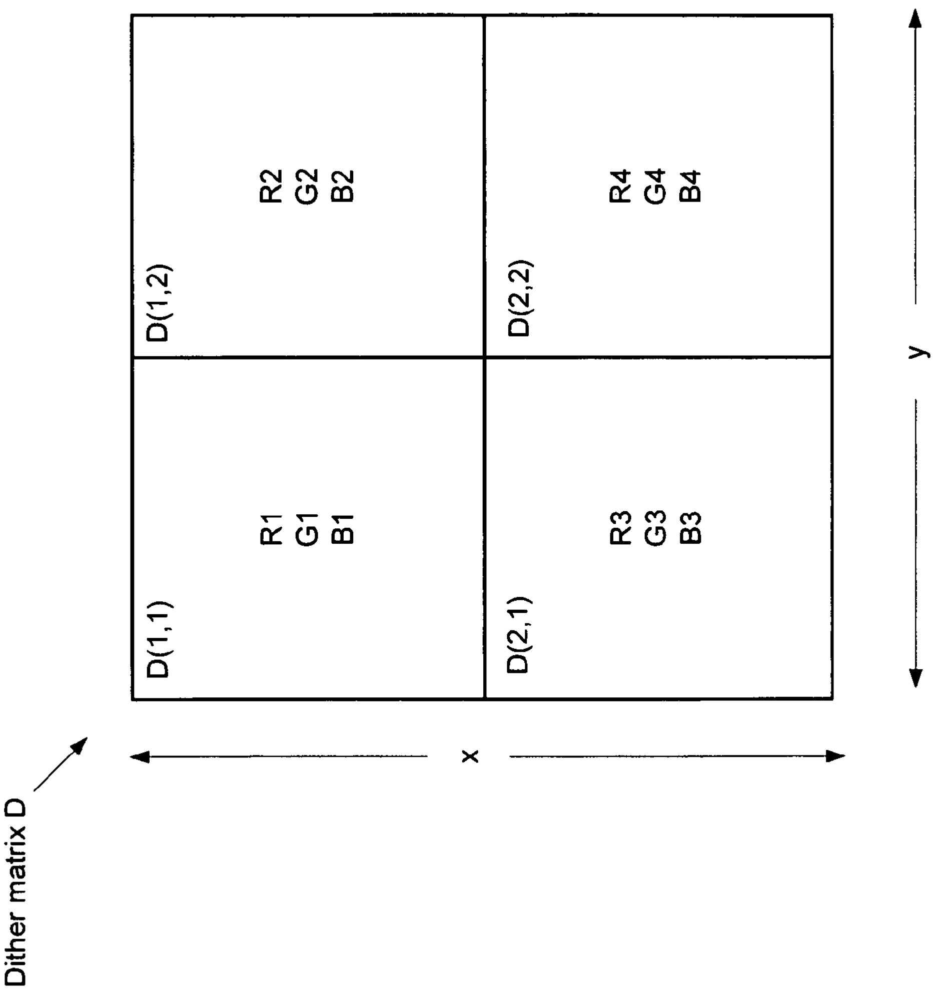
FIG. 2 shows a representative dither matrix.

For example, video processor 102 can provide pixel data word 108 having m bits where a first of the m bits is a most significant bit MSB and an $m^{th}$ of the m data bits is a least significant bit (LSB). In order to provide display 104 with the pixel data of appropriate length (i.e., n<m), then a number d of the least significant bits LSB (where d=m−n) can be used to provide spatial dithering. Spatial dithering introduces noise to the least significant bit (or bits) of the displayed pixels by applying specially-chosen dither bits to blocks of color component words. Accordingly, in the particular embodiment shown in FIG. 1, video processor 102 includes at least a programmable dither block 110 that can provide complete control of a dither pattern 112 and associated format of a dither pattern associated therewith. For example, a typical dither pattern can be embodied in the form of dither matrix D shown in FIG. 2. Dither matrix D can be formed of x rows by y columns for a total of x×y cells. Typically, dither matrix D is configured as a square matrix where x=y where x can typically range from x=2 to 16 or more. In the described embodiments, each matrix element $D_{ij}$ has a value of either 1 or 0 indicating whether or not the output level of the overlaid pixel is to be rounded up to a next higher truncated value (such as for example, if the matrix value is 1) or to the rounded down to the lower truncated value (such as for example if the matrix value is 0).

It should be noted that each pixel in a color capable display can have associated therewith three pixel values, one for each primary color, which in the example of an RGB type color display are red (R), green (G), and blue (B). Therefore, each element of dither matrix D can consist of a triplet representing a dither value for each of the color components associated with that particular pixel in the display. For example, dither matrix element D(1,1) can be a triplet value [R1, G1, B1] each value representing a different dither value for the pixel color components overlaid by dither matrix element D(1,1).

Figure 3:
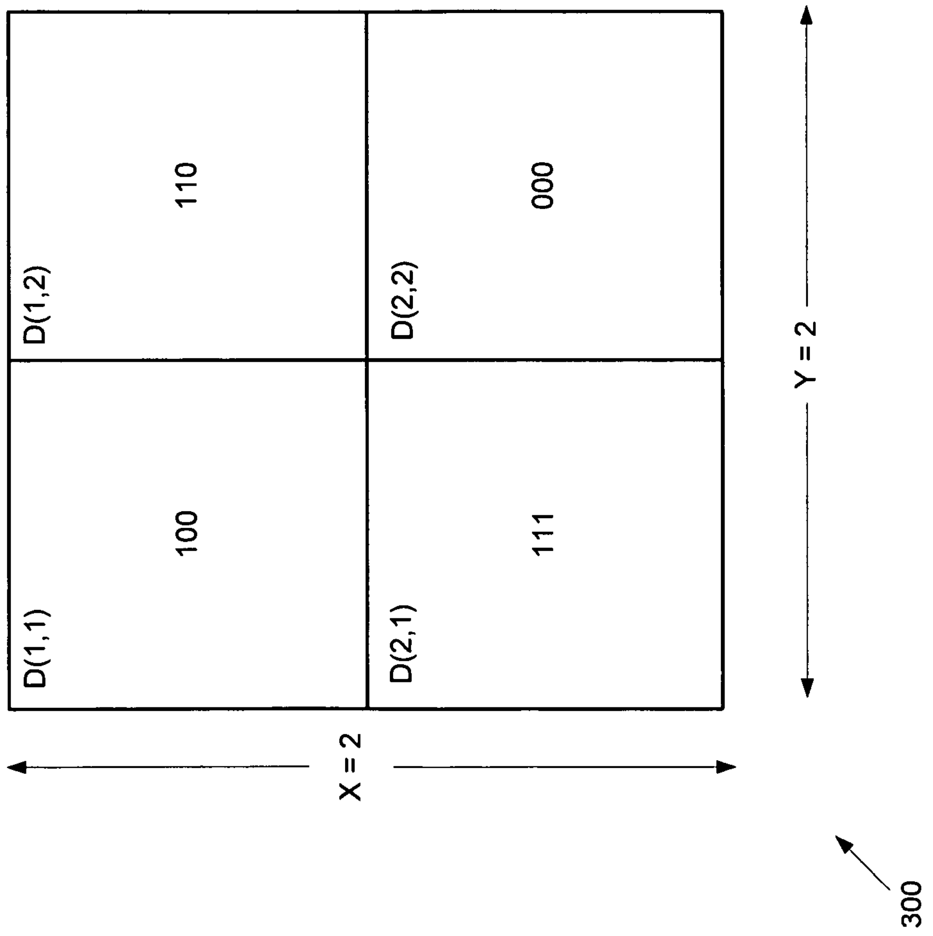
FIG. 3 shows a square dither matrix suitable for display device in RGB color space.

Therefore, in order to perform that requisite dither operation, dither matrix D sequentially overlays a corresponding number of to be displayed pixels until essentially all of the to be displayed pixels have been overlaid. For example, as shown in FIG. 3, dither matrix 300 is a square matrix having a total of four (4) elements, $$[D11=100, D12=110, D21=111, D22=000].$$

(As noted above, the short hand notation indicates dither values for each of the three color components for each pixel.)

During a spatial/temporal dither operation, dither matrix 300 sequentially overlays essentially all of the pixels to be displayed in a frame F for a sequential number of frames T. It should be noted that in accordance with the principle of temporal dithering discussed above, the application of dither matrix 300 over the number of frames T has an average that is substantially equal to zero. During the dither operation carried out in each frame F, each dither matrix element determines if the color components of the associated pixel is rounded “up to 1” or “down to 0”. For example, during the dither operation, when dither matrix 300 overlays frame $F_1$, pixel [1,1] is overlaid by dither matrix element D(1,1) causing R pixel value to be rounded up, G pixel value to be rounded down, and B pixel value to be rounded down, and so on. The dithering operation calls for dither matrix 300 to overlay substantially all of the display pixels to be displayed associated with frame $F_1$. The dithering operation is repeated for a next frame $F_2$ and so on for at least a number T frames at which point another dither matrix can used that is typically different from dither matrix 300.

Referring back to FIG. 1, video processor 102 can also include data splitter circuit 114 arranged to control if incoming video data is dithered or not. For example, if it is determined that display unit 104 can display the full color gamut output by video processor 102, then full color gamut video stream 116 can be passed directly display unit 104 by way of video processor interface 106. However, if it is determined that display unit 104 cannot display the full color gamut video provided by video processor 102, then data splitter 114 provides a truncated video stream (also referred to as panel bits) 118 and dither bits 120 to programmable dither block 110 for further processing.

Figure 4:
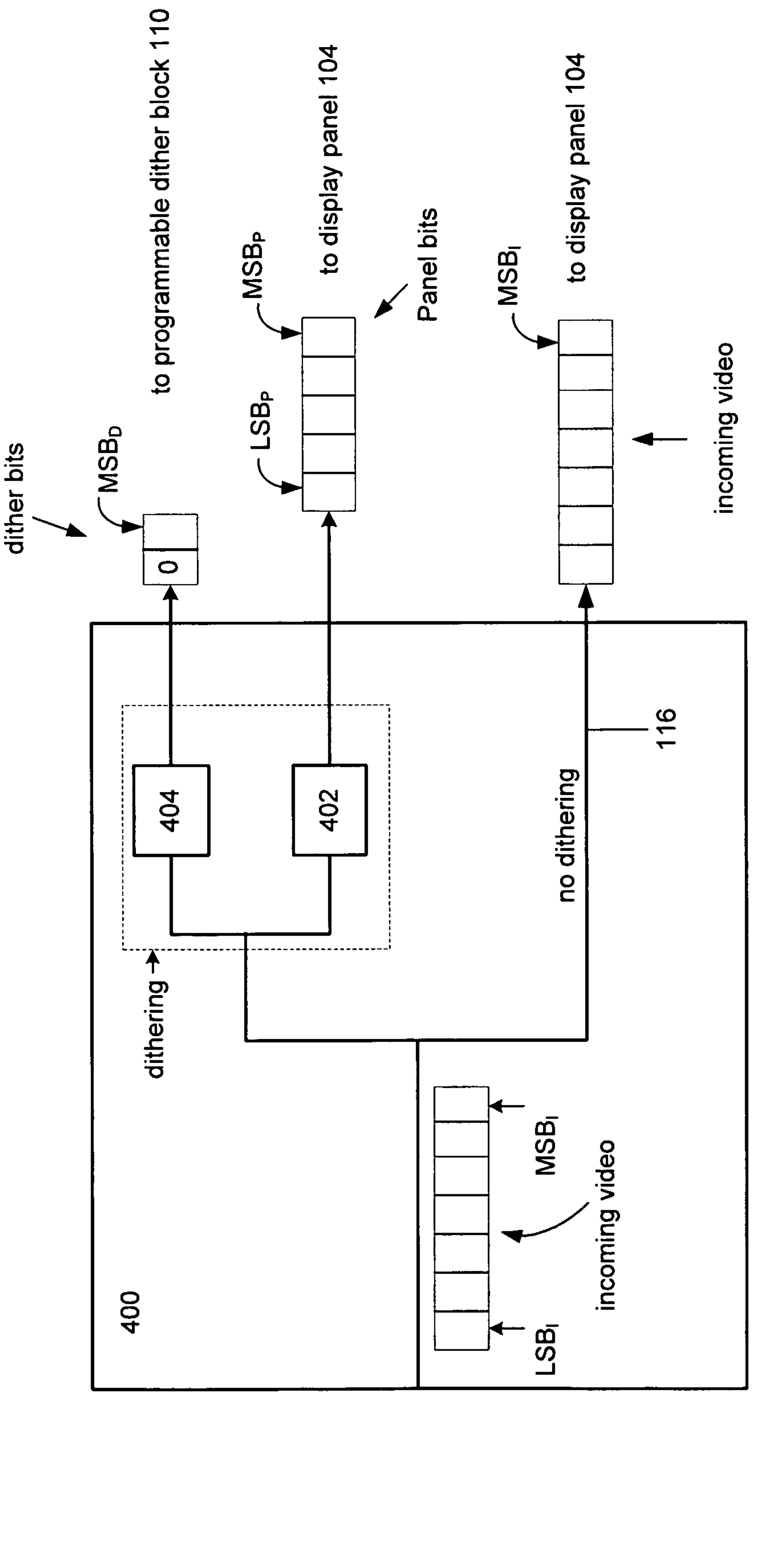
FIG. 4 that shows data splitter as a particular embodiment of data splitter as shown in FIG. 1.

Turning now to FIG. 4 that shows data splitter 400 as a particular embodiment of data splitter 114 shown in FIG. 1. As shown data splitter 400 can pass incoming video data to display panel 104 when it is determined that no dithering is required or that dithering has not been activated. In the described embodiment, the incoming video data bits can be aligned in such a way that the most significant bit of the incoming video data can be the most significant bit (MSB) of the video data sent to panel 104. However, when dithering is active, then panel bit controller 402 controls how many video data bits (referred to as panel bits) are forwarded to display 104 and dither bit controller 404 determines how many bits (referred to a dither bits) are forwarded to programmable dither block 110. In the described embodiment, the most significant of the dither bits sent to programmable dither block 108 by dither bit controller 404 is one (1) bit lower than the least significant of the panel bits. In other words, the incoming video data is truncated in such a way as the least significant bit (LSB) of the panel bits is one bit higher than the most significant bit (MSB) of the dither bits. Furthermore, the least significant bit(s) of the dither bits can become bit 0 in programmable dither block 110. The relationship between the P panel display bits, D dither bits, and I incoming video bits can be expressed as Eq. (1):

$$P_{bits}+D_{bits}\leqq I_{bits} \quad \text{Eq. (1).}$$

Figure 5:
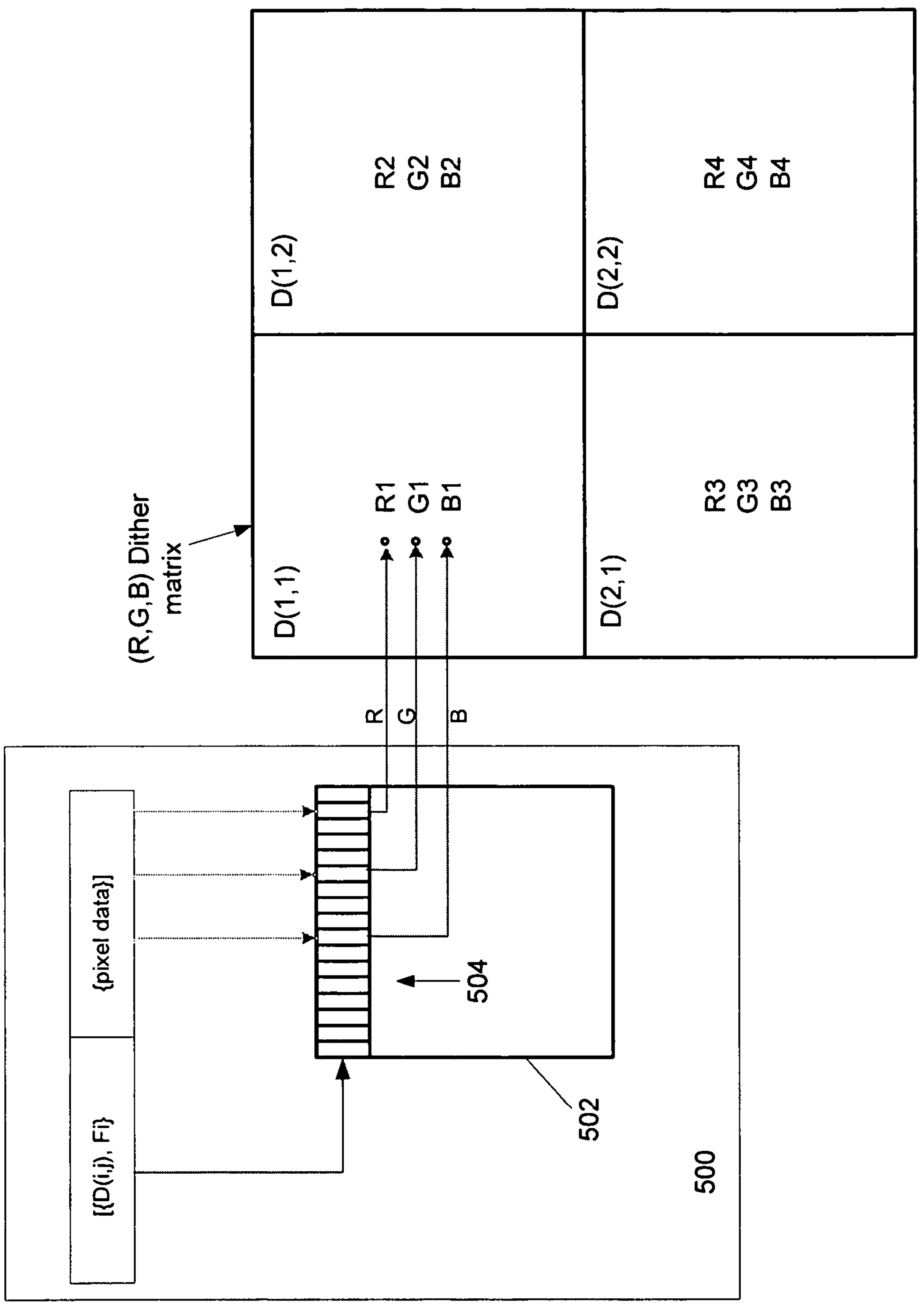
FIG. 5 shows a representative configuration of programmable dither block shown in FIG. 1 in accordance with the described embodiments.

FIG. 5 shows a representative configuration 500 of programmable dither block 110 in accordance with the described embodiments. Programmable dither block 500 allows for complete flexibility of the actual dither patterns used as well as the format of the dither patterns. As described above, a dither scheme typically employs a square matrix p×p cells, where p can range from 2 to 16 or higher. The matrix then overlays the display pixels. This overlay operation is then repeated over the entire display area thereby covering substantially all pixels that are to be displayed. In the described embodiment, the particular dither matrix to be used can be selected from a number of matrices stored in programmable dither block 500. The selection of the particular dither matrix to be used can be based upon, for example, a value of the data bits to be dithered and the frame number. In the described embodiment, programmable dither block 500 can include memory block 502 formed of a number of pattern memory locations with one bit per location. Furthermore, in the described embodiments, in order to access information stored in memory block 502, the current location (I,J) in the dither matrix, the frame number $F_i$, and pixel data to be dithered can be concatenated into a memory address. The memory address can be used to point to a desired location in memory block 502. In this way, information (in the form of a dither word used to characterize a particular dither pattern and/or format) stored at the desired location in memory block 502 can be accessed. Such access can include reading a dither bit included in the dither word indicating a dither up or a dither down operation to be performed for a particular pixel.

For example, in one embodiment, memory block 502 can be formed of 1024 memory locations (i.e., 32 rows and 32 columns) optimally configured as 32 dither words each having 32 bits each. Using the concatenated addressing scheme described above, since the position (I,J) in the matrix and the frame number $F_i$ remain constant for a particular R, G, B pixel value, the pixel data component of the concatenated address can be used to select one of the 32 bits in the selected dither word for each of the color components, R, G, B. In this way, there is but a single memory address per pixel, however, since the pixel value is different for each color R, G, B, there must be three memory accesses per address per pixel. However in one implementation, the three memory address accesses can be performed by selecting a single bit from the selected dither word 504 read from memory block 502 using a multiplexer. Therefore, the matrix location (I,J) and frame number $F_i$ are used to point to an address in memory block 502 containing a desired dither word 504. The pixel value component of the concatenated address are used to select one bit from the thirty two bit word for each color R, G, B color component.

In this embodiment, the dither word can be 32 bits wide to allow for different dither patterns for each color R, G, B. It should be noted that in order to add greater flexibility, as well as the dither patterns being programmable, the dither format is also programmable. Since the dither matrix can be 2×2 to 16×16 and higher, the temporal sequence may be from 1 frame to 16 frames and the dither value can be up to four bits. Furthermore, the dither patterns stored in memory block 502 can be duplicated with transformations in order to create a desired dither matrix.

Figure 6:
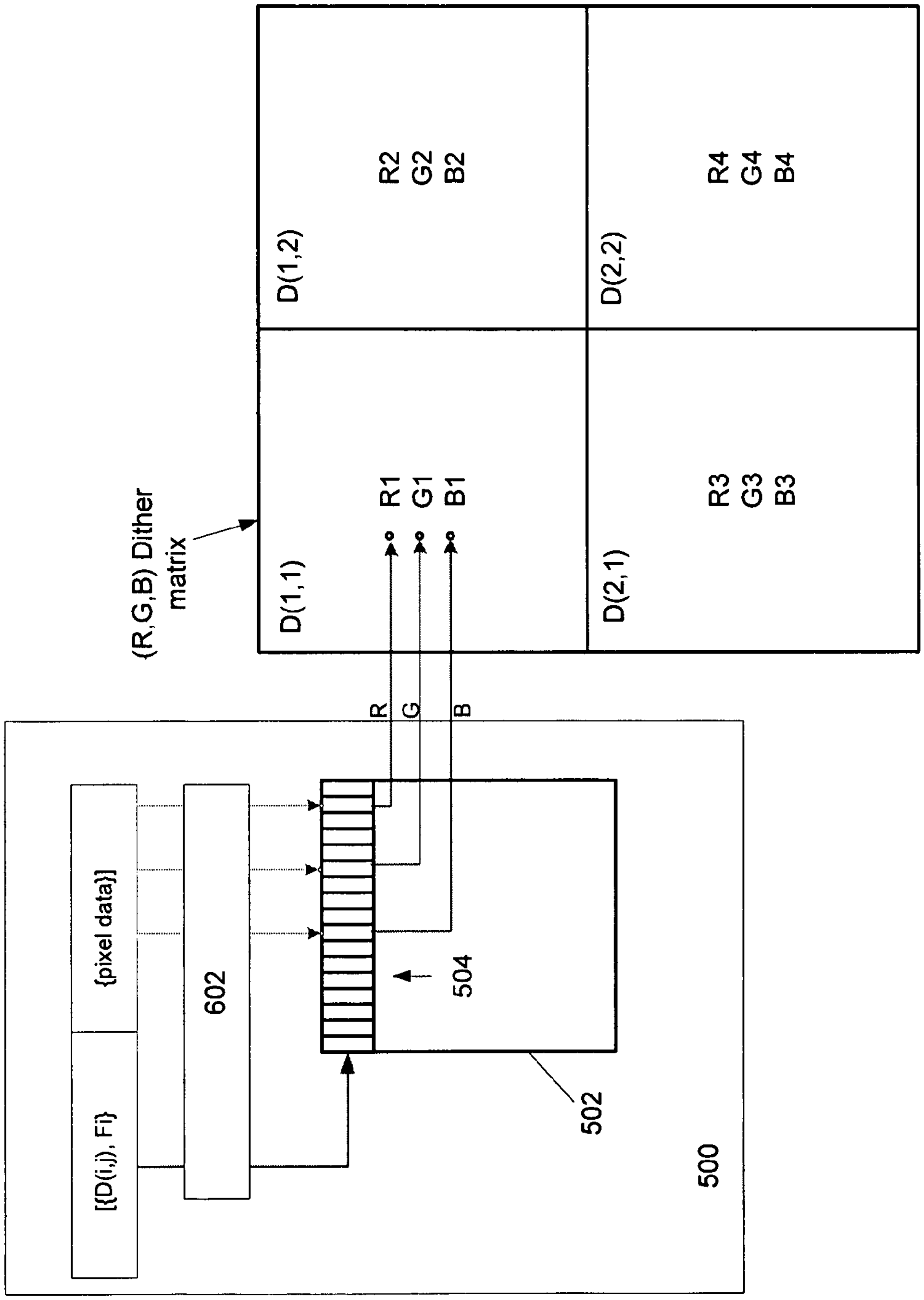
FIG. 6 shows a programmable dither block shown in FIG. 5 with a programmable logic block.

In another embodiment shown in FIG. 6, programmable dither block 500 can include a programmable logic module 602 that can receive the pattern memory address (i.e., $D_{ij}$ position and Frame number $F_i$). The programmable logic module 602 can then point to the address in the memory block 502 containing the dither word 504 that is used to control the format of the dither. Programmable logic module 602 can include a number of look up tables (LUTs) each having selectable inputs. The LUTs can vary in size, from, for example, 4 to 32 bits, allowing logic equations with two to five inputs. Of course, the size of the LUTs can be greater than 32 or less than 4, depending on the application at hand. By having LUTs of differing sizes, more complex logic equations can be implemented without a substantial increase in cost but providing a high degree of programmability of the format of the dither. It should be noted that dither patterns can be created by taking a basic pattern and transforming it by, for example, flipping it either horizontally or vertically. These transformations can be achieved by merely combining the various input bits into the correct logic.

Figures 7, 7A, 7B, 7C:
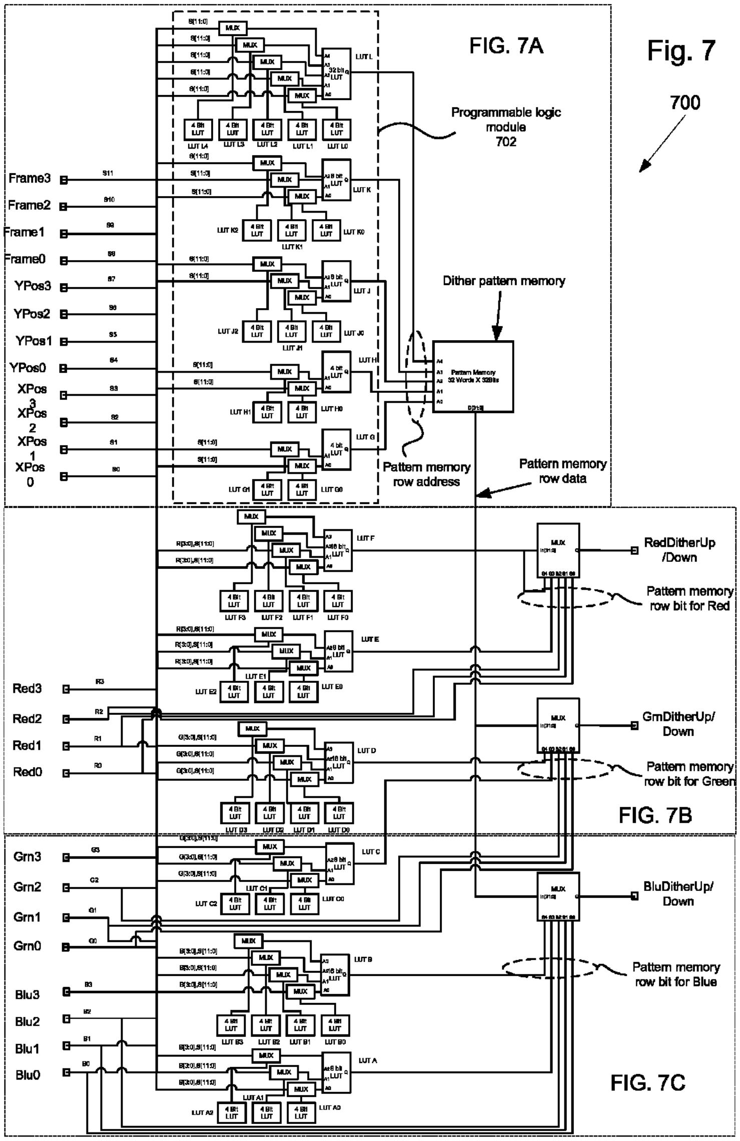
FIGS. 7A-C show a specific implementation of the programmable dither block shown in FIG. 6.
Figure 7A:
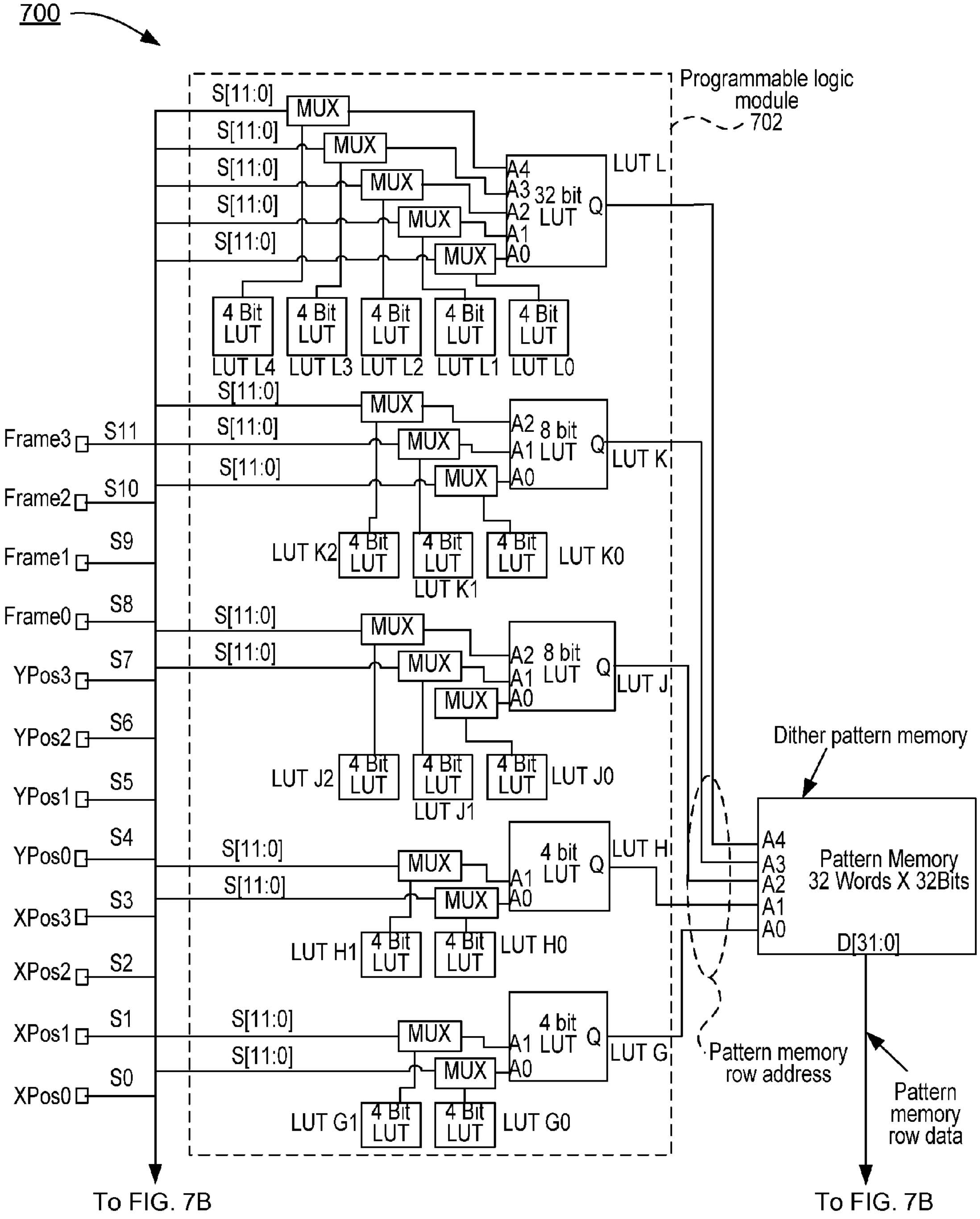
Figure 7B:
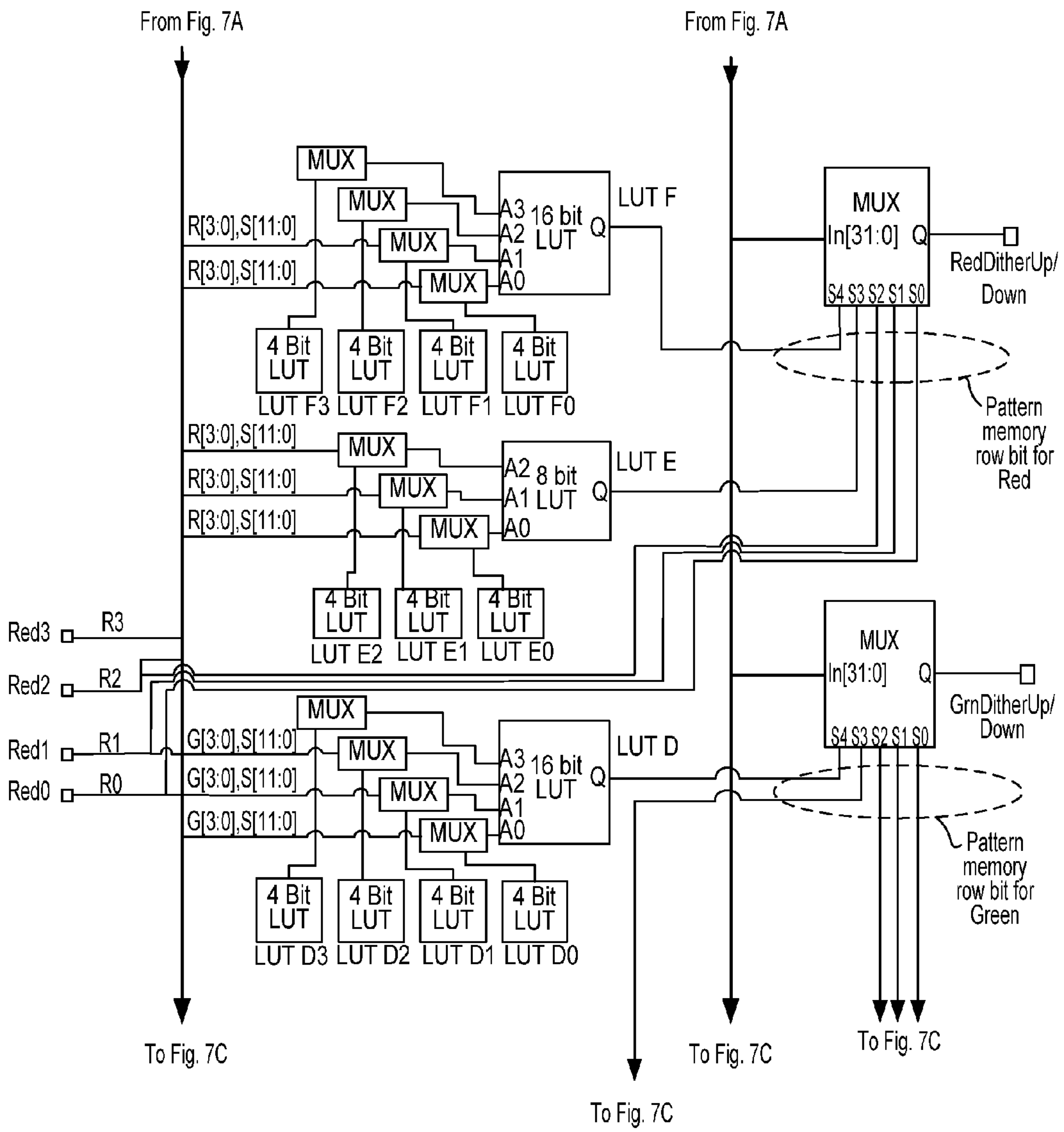
Figure 7C:
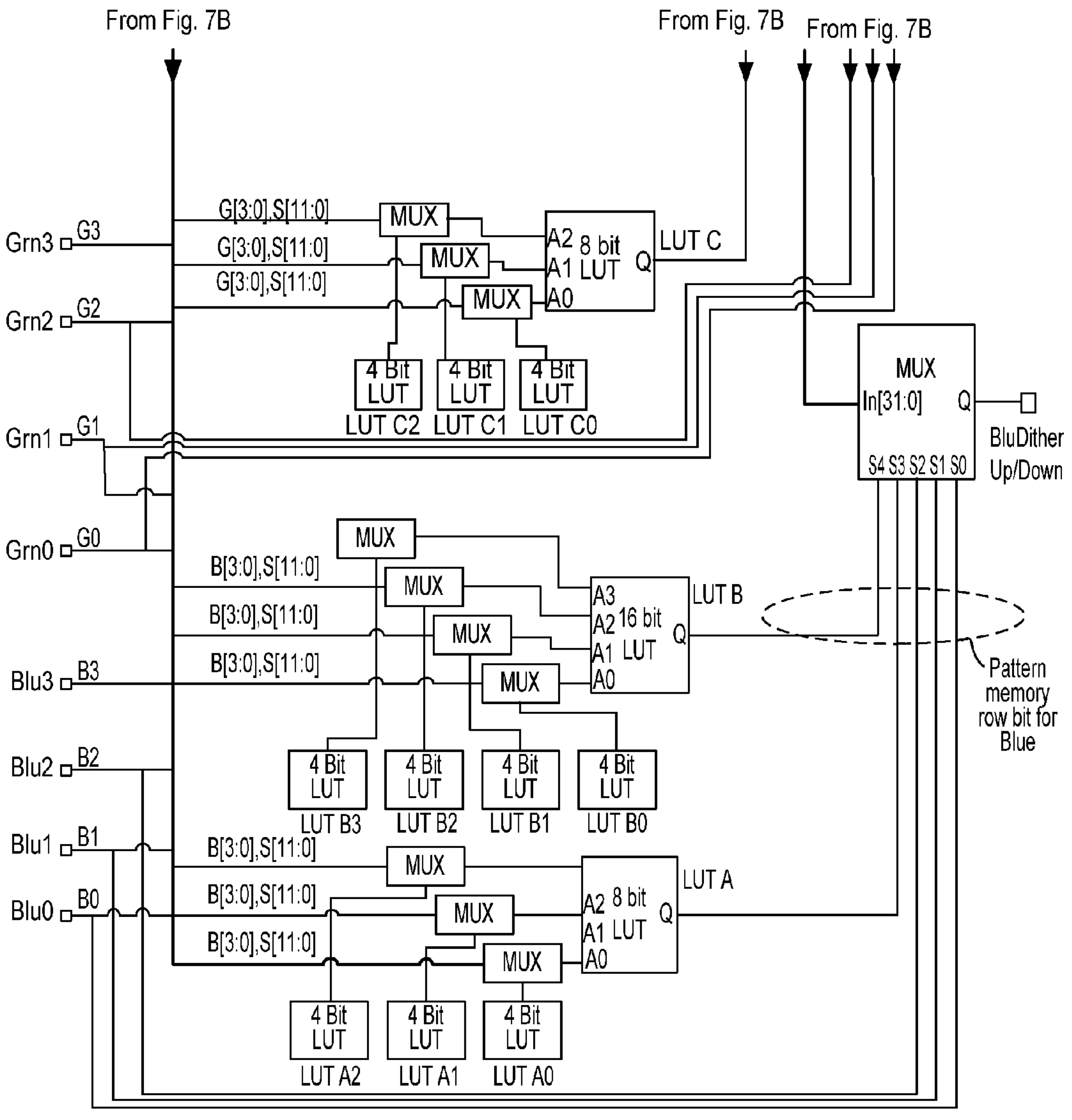

FIGS. 7A-C show a particular implementation of programmable dither block 700.

Figure 8:
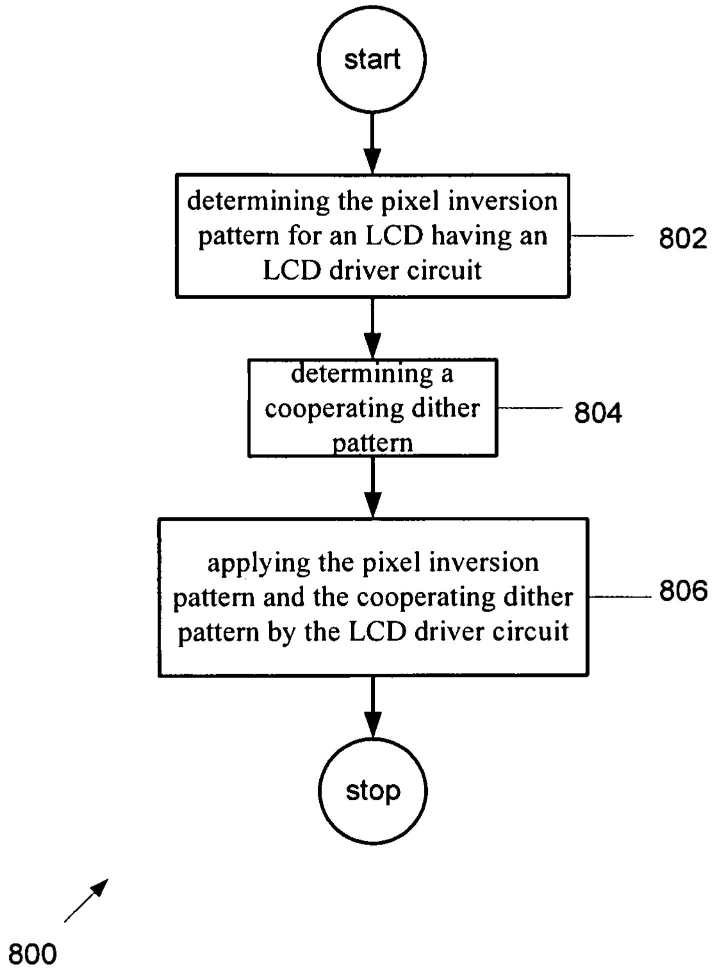
FIG. 8 shows flowchart detailing a process for harmonizing a dither pattern and a pixel inversion pattern in accordance with the described embodiments.

FIG. 8 shows a flowchart detailing process 800 for harmonizing a pixel inversion pattern and a dither pattern for an LCD. Process 800 can be carried out by the following operations. At 802, a pixel inversion pattern for an LCD having an LCD driver circuit is determined. Next, at 804, a cooperating dither pattern is determined. At 806, the cooperating dither pattern is then applied by an LCD driver circuit to display pixels such that there are substantially no visible artifacts created.

Figure 9:
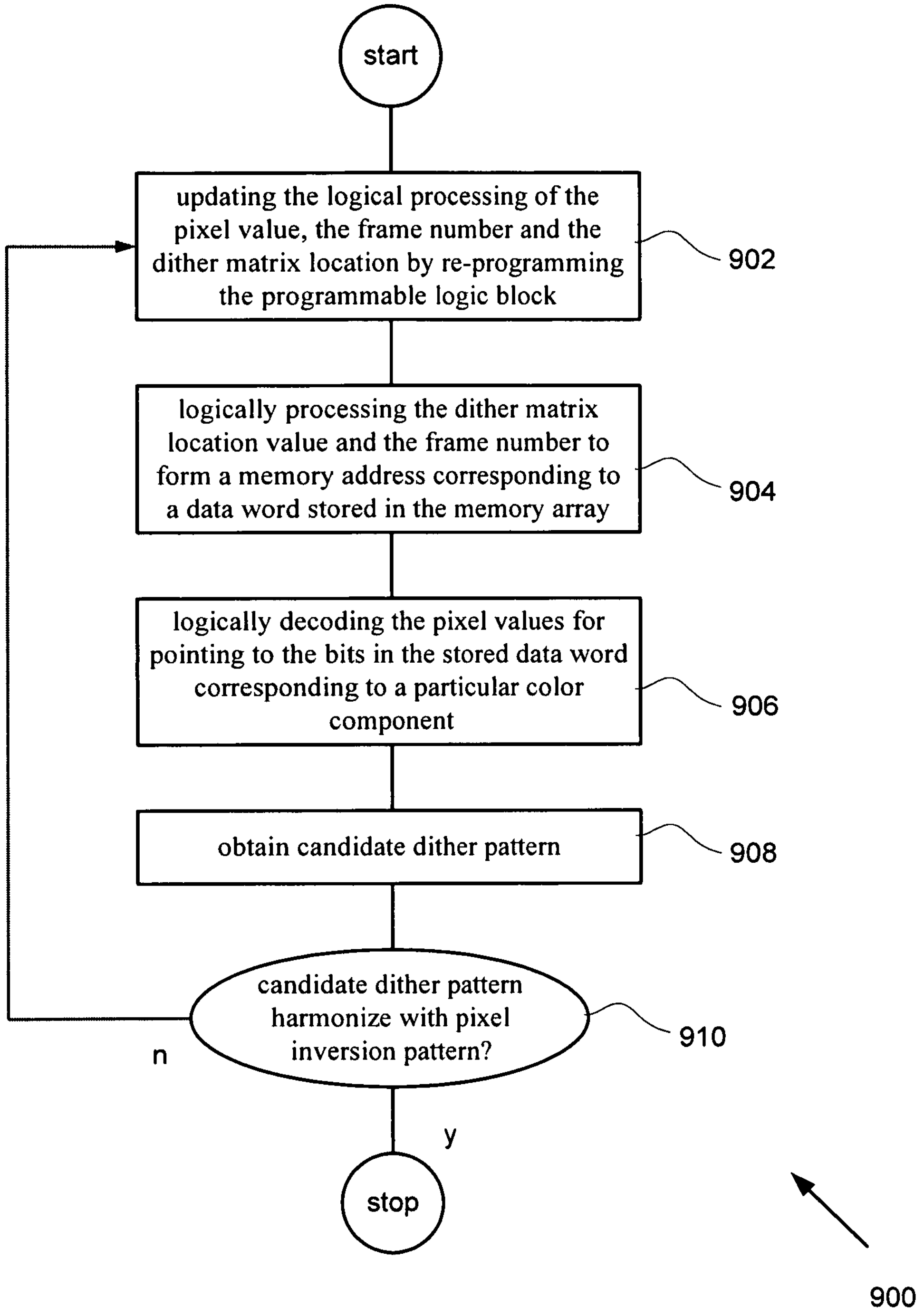
FIG. 9 shows a flowchart detailing a process for selecting a candidate dither pattern by reprogramming a programmable logic block used to select the candidate dither pattern.

FIG. 9 shows a flowchart detailing process 900 for determining the cooperating dither pattern in accordance with the described embodiments. At 902, the programmable logic block is reprogrammed in order to update the logical processing of the pixel value, the frame number and the dither matrix location by re-programming the programmable logic block. At 904, the dither matrix location value and the frame number are logically processed by the programmable dither block having the reprogrammed logic to form a memory address corresponding to a data word stored in the memory array. At 906, the pixel values are logically decoded using the updated logic from the reprogrammed programmable logic block, the logical decoding can be used for pointing to the bits in the stored data word corresponding to a particular color component. At 908, based upon the logical processing by the programmable logic block, a candidate dither pattern is obtained. At 910, a determination is made if the candidate dither pattern and the pixel inversion pattern are harmonized. If the determination indicates that the candidate dither pattern and the pixel inversion pattern are harmonized, then process 900 is complete, otherwise, control is passed back to 902 to obtain another candidate dither pattern.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. In a liquid crystal display (LCD) driver circuit, a method of harmonizing a pixel inversion pattern and a dither pattern, comprising:

determining the pixel inversion pattern for the LCD; and determining a cooperating dither pattern, wherein the pixel inversion pattern and the cooperating dither pattern interact with each other in such a way that there are substantially no discernable video artifacts generated, wherein the LCD driver circuit comprises a programmable dither block comprising:

a memory array arranged to store a plurality of dither patterns;

a programmable logic block; and an address buffer coupled to the programmable logic block arranged to store a pixel value, a frame number, and a dither matrix location value.

2. The method as recited in claim 1, further comprising:

receiving the dither matrix location value, the frame number and the pixel value at the programmable logic block from the address buffer; and logically processing the dither matrix location value and the frame number to form a memory address corresponding to a data word stored in the memory array.

3. The method as recited in claim 2, further comprising:

logically decoding the pixel values for pointing to the bits in the stored data word corresponding to a particular color component.

4. The method as recited in claim 1, wherein the determining the cooperating dither pattern comprises:

updating the logical processing of the pixel value, the frame number and the dither matrix location by re-programming the programmable logic block.

5. A non-transitory computer-readable medium executable by a processor for harmonizing a pixel inversion pattern and a dither pattern in a liquid crystal display (LCD) driver circuit, the computer-readable medium comprising:

computer code for determining the pixel inversion pattern for the LCD; and computer code for determining a cooperating dither pattern, wherein the pixel inversion pattern and the cooperating dither pattern interact with each other in such a way that there is substantially no discernable video artifacts generated, wherein the LCD driver circuit comprises a programmable dither block comprising:

a memory array arranged to store a plurality of dither patterns;

a programmable logic block; and an address buffer coupled to the programmable logic block arranged to store a pixel value, a frame number, and a dither matrix location value.

6. The computer-readable medium as recited in claim 5, further comprising:

computer code for receiving the dither matrix location value, the frame number and the pixel value at the programmable logic block from the address buffer; and computer code for logically processing the dither matrix location value and the frame number to form a memory address corresponding to a data word stored in the memory array.

7. The computer-readable medium as recited in claim 6, further comprising:

computer code for logically decoding the pixel values for pointing to the bits in the stored data word corresponding to a particular color component.

8. The computer-readable medium as recited in claim 7, wherein the computer code for determining the cooperating dither pattern comprises:

computer code for updating the logical processing of the pixel value, the frame number and the dither matrix location by re-programming the programmable logic block.

9. An apparatus for harmonizing a pixel inversion pattern and a dither pattern, comprising:

a programmable dither block; and a processor in communication with the programmable dither block arranged to determine the pixel inversion pattern for the LCD, and determine a cooperating dither pattern, wherein the pixel inversion pattern and the cooperating dither pattern interact with each other in such a way that there is substantially no discernable video artifacts generated, wherein the programmable dither block comprises:

a memory array arranged to store a plurality of dither patterns;

a programmable logic block; and an address buffer coupled to the programmable logic block arranged to store a pixel value, a frame number, and a dither matrix location value.

10. The apparatus as recited in claim 9, wherein the processor is further arranged to, receive the dither matrix location value, the frame number and the pixel value at the programmable logic block from the address buffer, logically process the dither matrix location value and the frame number to form a memory address corresponding to a data word stored in the memory array, and logically decode the pixel values for pointing to the bits in the stored data word corresponding to a particular color component.

11. The apparatus as recited in claim 10, wherein the determining the cooperating dither pattern comprises:

updating the logical processing of the pixel value, the frame number and the dither matrix location by re-programming the programmable logic block.

12. An integrated circuit, comprising:

a programmable dither block; and a processor in communication with the programmable dither block arranged to harmonize a pixel inversion pattern and a dither pattern for an LCD by determining the pixel inversion pattern for the LCD, and determine a cooperating dither pattern, wherein the pixel inversion pattern and the cooperating dither pattern interact with each other in such a way that there is substantially no discernable video artifacts generated, wherein the programmable dither block comprises:

a memory array arranged to store a plurality of dither patterns;

a programmable logic block; and an address buffer coupled to the programmable logic block arranged to store a pixel value, a frame number, and a dither matrix location value.

13. The integrated circuit as recited in claim 12, wherein the processor is further arranged to, receive the dither matrix location value, the frame number and the pixel value at the programmable logic block from the address buffer, logically process the dither matrix location value and the frame number to form a memory address corresponding to a data word stored in the memory array, and logically decode the pixel values for pointing to the bits in the stored data word corresponding to a particular color component.

14. The integrated circuit as recited in claim 12, wherein the determining the cooperating dither pattern comprises:

updating the logical processing of the pixel value, the frame number and the dither matrix location by re-programming the programmable logic block.

* * * * *